B. S. CHILSON.
TWIN SEAT CONSTRUCTION FOR MOTOR CYCLES.
APPLICATION FILED MAY 28, 1917.
1,279,260.
Patented Sept. 17, 1918.
2 SHEETS—SHEET 1.
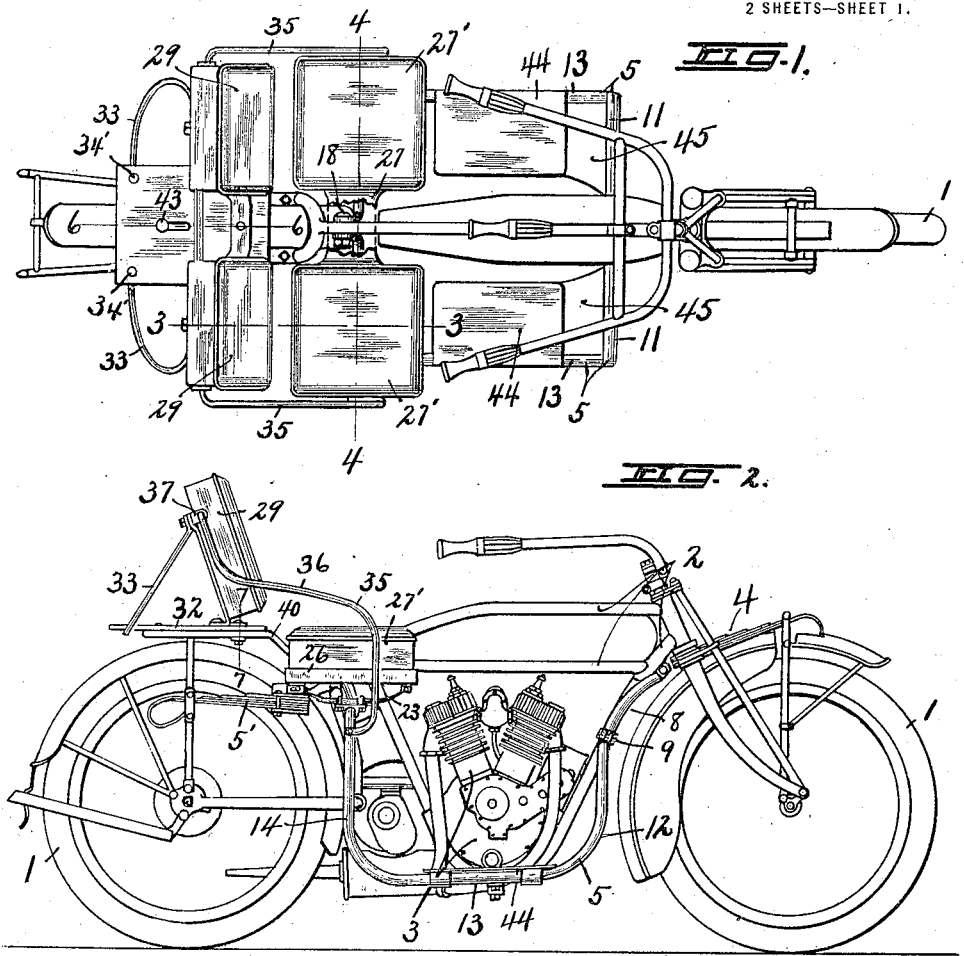
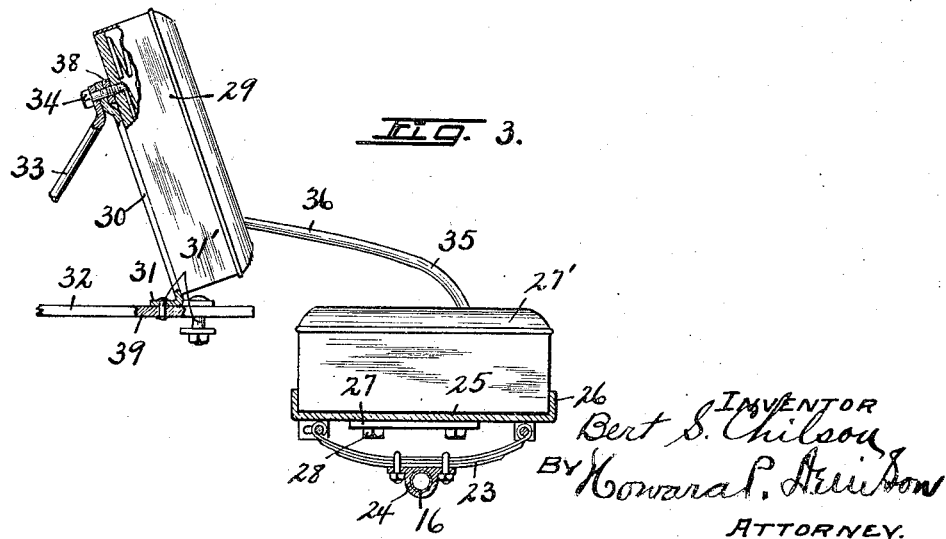
INVENTOR
Bert S. Chilson
BY Howard P. Denison
ATTORNEY.

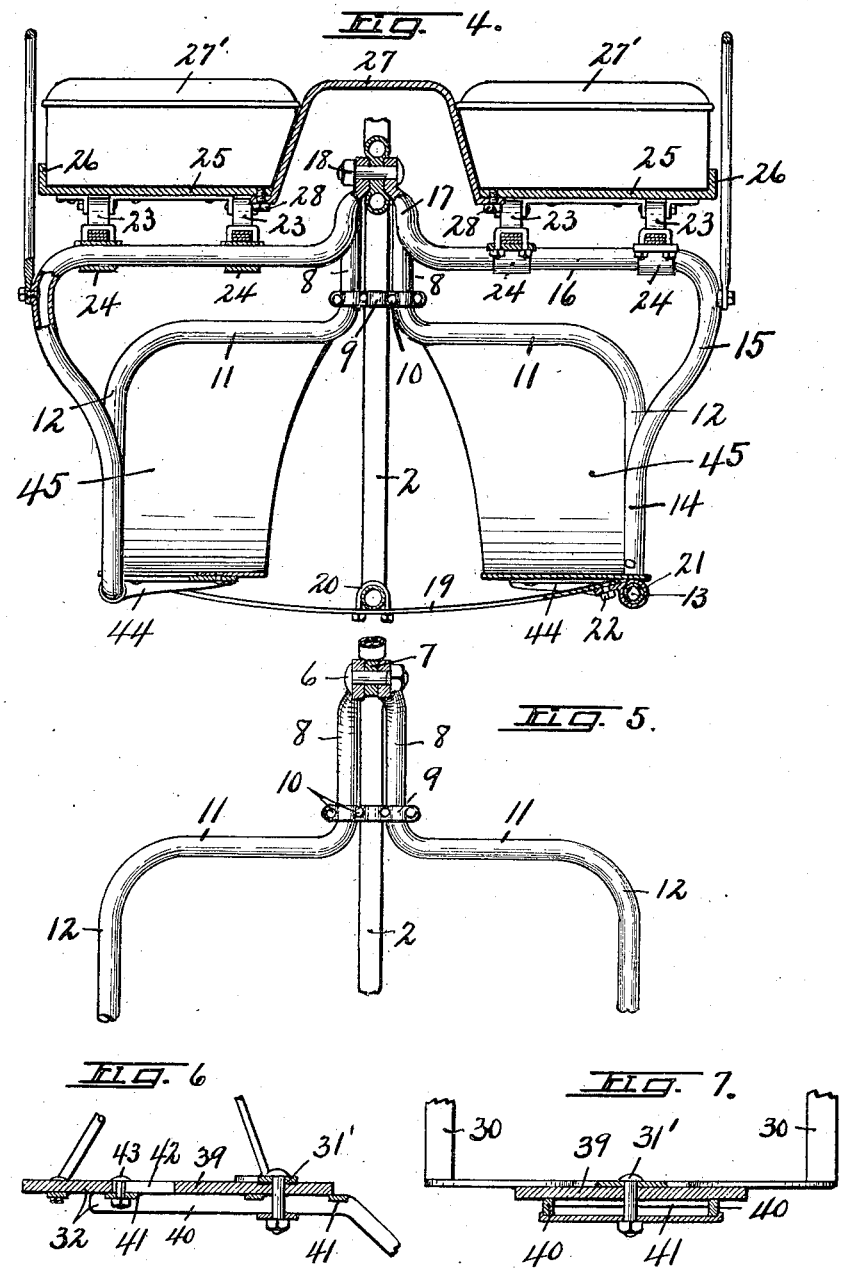

UNITED STATES PATENT OFFICE.

BERT S. CHILSON, OF ELLIS ISLAND, NEW YORK.

TWIN-SEAT CONSTRUCTION FOR MOTOR-CYCLES.

1,279,260.   Specification of Letters Patent.   Patented Sept. 17, 1918.

Application filed May 28, 1917. Serial No. 171,467.

*To all whom it may concern:*

Be it known that I, BERT S. CHILSON, a citizen of the United States of America, and resident of Ellis Island, in the county of New York, in the State of New York, have invented new and useful Improvements in Twin-Seat Construction for Motor-Cycles, of which the following, taken in connection with the accompanying drawings, is a full, clear, and exact description.

This invention relates to certain improvements in twin seat construction for motor-cycles.

The primary object of the invention is to provide a construction in which two seats are provided disposed side by side upon opposite sides of the vehicle frame, whereby the vehicle is adapted to carry two persons both facing in the direction of movement of the vehicle.

A subsidiary object resides in the formation of the seat structure, including seat backs, guard rails and the like, of unitary construction adapted for attachment to any motorcycle.

A further object resides in the spring supports for the seats independent of the motor frame which may or may not be spring supported.

Another object resides in the adjustability of the seat backs which are adapted for movement independently of the seats.

Other objects relate to the details of construction and attachment of the seat structure to the motorcycle frame in an efficient and rigid manner, all of which will more clearly appear from the following description, taken in connection with the accompanying drawings, in which—

Figure 1 is a top plan view of a motorcycle of known construction with the seating structure of this invention applied thereto.

Fig. 2 is a side elevation of the same.

Fig. 3 is a cross section on line 3—3, Fig. 1.

Fig. 4 is a cross section on line 4—4, Fig. 1.

Fig. 5 is a view showing the connection of the forward end of the side or guard rails to the frame.

Fig. 6 is a cross section on line 6—6, Fig. 1.

Fig. 7 is a section on line 7—7, Fig. 2.

The invention as here illustrated is shown as applied to a commercial motorcycle having a spring-supported frame, but it is obvious that the invention is of a broader character and is adapted for application to many and various constructions of motorcycles.

The motorcycle comprises the usual wheels —1—; frame —2—, supported thereby, and motor and power-transmitting means —3— carried by the frame.

The frame of this construction of motorcycle has a three-point spring suspension from a forward spring —4— and a pair of rear springs —5— disposed upon opposite sides of the rear wheel.

The usual saddle may be removed from the motorcycle prior to the application of the seating structure of this invention.

The seating structure comprises a pair of side bars —5— which constitute guard rails and may be of tubular metal construction.

The front ends of the side bars are connected as by a bolt —6— to a lug —7— formed on the forward portion of the frame and being the usual connection provided on motorcycles for engaging portions of a side car.

The guard rails have portions —8— extending downwardly along the frame —2— for a distance of twelve or fifteen inches, at which point both side rails and the frame are engaged by a clip —9— formed preferably of two duplicate parts connected together by bolts —10— and constituting a second point of connection of the side rails to the frame.

The rails are then bent outwardly at substantially right angles to the motor frame a suitable distance to form substantially horizontal parts —11— and are then bent downwardly at the outer ends of the horizontal portion to a point substantially on a plane with the lower portion of the frame —2— forming substantially vertical portions —12— and are then bent rearwardly along the side of the frame to a point adjacent the forward portion of the rear wheel forming substantially horizontal portions —13—.

The side rails are then bent upwardly to a point at which the seats should be supported forming substantially vertical portions —14— with outwardly curved loops —15— adjacent their upper ends, and are then turned inwardly and extend inwardly to substantially the motorcycle frame forming substantially horizontal seat-carrying portions —16—, at which point the ends —17— are turned upwardly and are secured to the frame by bolt —18— passed through an opening in the frame, likewise formed in commercial motorcycles for attachment of the usual side car.

The horizontal portions —13— are connected together and to the frame —2— by a cross iron or bar —19— secured to the frame by an ordinary clip —20— and to the opposite portions —13— by fittings —21—. Preferably these fittings have tubular parts mounted on the portions —13— and extending lugs to which the cross iron is secured, as by means of bolts —22—. The fittings may be spot-welded or otherwise secured to the portions —13— if desired.

A pair of semi-elliptical springs —23— is mounted upon each horizontal seat portion —16— by means of clips —24— which may be secured to the portions —16— in any suitable way, as by welding or the like.

A seat plate —25— is mounted upon each respective pair of springs. One end of the springs may be rigidly secured to the plate, while the opposite end has a limited sliding movement relatively to the plate to permit depression of the ends of the springs relatively to the central portion when weight is applied to the seat.

This connection may be accomplished by slotted lugs formed in connection with the seat plates, in the slots of which pins formed upon the springs are slidably mounted.

Each seat plate is supported by a pair of springs mounted on its respective portion —16— and these plates are preferably provided with upstanding flanges —26— extending around three sides thereof, the inner sides of the seat plates being connected together by yoke —27— secured to each seat plate in any suitable manner, as by bolts —28—.

Upon each seat plate and within the flange thereof is preferably positioned a suitable spring cushion —27′—. The inner side of the cushion may conform to the angular disposition of the adjacent side of yoke —27—.

A suitable spring back —29— is provided for each seat, and these backs are supported by standards —30— preferably integrally connected by a substantially flat horizontal portion —31— secured to the usual luggage carrier —32— by bolts —31′—.

A curved spring brace rod —33— is provided for each back, one end of the rods being secured to bolts —34— engaged with the backs —29— and the supports —30—, the opposite end of the braces —33— being secured to the luggage carrier —32— by bolts —34′—.

Side rails —35— are also provided for the seats, the forward end of the rail being bent downwardly and then rearwardly and secured to the looped portions —15— of the guard rails —5—. The intermediate portions —36— of the side rails extend substantially horizontally along the side of the seats and are then bent upwardly adjacent the backs —29— and engage lugs —37— formed upon bars —38— mounted upon the bolts —34—.

The method of supporting the backs —29— independently of the seat plates —25—, except so far as the side rails constitute an indirect connection between the parts, permits the adjustment of the backs toward and from the seats to accommodate persons of different size.

This adjustment may be effected by adjusting the plate —39— of the luggage carrier —32— which is adjustably mounted upon the rearwardly extending bars —40— of the luggage carrier, which bars are connected by cross plates —41—. The adjustable mounting of plate —39— is effected through the medium of slot —42— and bolt —43— positioned in said slot and engaged with one of the cross bars —41—.

The side rails —36— and the braces —33— are sufficiently flexible to permit any reasonable adjustment of the backs relatively to the seats.

The guard rails —5— are preferably provided with foot boards —44—, preferably secured to the horizontal portions —13— of said rails and dispensing with the usual foot boards, and the guards may further carry suitable shields —45— formed of canvas, sheet metal, or other suitable material, and preferably extending only between the foot boards and the horizontal portions —11— of the rails.

It will now be apparent that the seat structure is of a unitary character adapted for application to motorcycles of various construction and that the connections provided are of a rigid, firm nature, and that the seat structure is spring-supported in addition to the spring supports for the vehicle frame as provided in the commercial motorcycle illustrated, and although I have shown this specific illustration and application of seating structure, I do not desire to limit myself to the details of form, construction or arrangement, as many and various changes may be made without departing from the spirit of this invention as set forth in the appended claims.

What I claim is:—

1. A seat structure for motorcycles comprising a pair of bars having their opposite ends adapted to be connected, respectively, to the front and rear portions of a motorcycle frame, said bars having horizontal portions adjacent their rear ends, and seats mounted on the horizontal portions of said bars.

2. A seat structure for motorcycles comprising a pair of bars having their opposite ends adapted to be connected, respectively, to the front and rear portions of a motorcycle frame and disposed upon opposite sides of said frame, and seats mounted on said bars.

3. A seat structure for motorcycles comprising a pair of bars having their opposite ends adapted to be connected, respectively, to the front and rear portions of a motorcycle frame, said bars having horizontal portions adjacent their rear ends, springs mounted on the horizontal portions of said bars, and seats mounted on the springs.

4. A seat structure for motorcycles comprising a pair of bars having their opposite ends adapted to be connected, respectively, to the front and rear portions of a motorcycle frame and disposed upon opposite sides of said frame, springs mounted on said bars, and seats mounted on the springs.

5. A seat structure for motorcycles comprising a pair of bars positioned upon opposite sides of the frame and having their front and rear ends adapted to be connected to front and rear portions, respectively, of the motorcycle frame, said bars provided with substantially horizontal portions extending laterally of the motorcycle frame and toward each other, and seats mounted upon the horizontal laterally extending portions.

6. A seat structure for motorcycles comprising a pair of bars positioned upon opposite sides of the frame and having their front and rear ends adapted to be connected to front and rear portions, respectively, of the motorcycle frame, said bars provided with substantially horizontal portions extending laterally of the motorcycle frame and toward each other, semi-elliptical springs mounted on said laterally extending horizontal portions, and seats mounted on the springs.

7. A seat structure for motorcycles comprising a pair of bars positioned upon opposite sides of the frame and having their front and rear ends adapted to be connected to front and rear portions, respectively, of the motorcycle frame, said bars provided with substantially horizontal portions extending laterally of the motorcycle frame and toward each other, semi-elliptical springs mounted on said laterally extending horizontal portions, and seats mounted on the springs, one end of the springs having a loose connection to the seat.

8. A seat structure for motor cycles comprising a pair of bars having their opposite ends adapted to be connected respectively to the front and rear portions of a motor cycle frame and disposed upon opposite sides of said frame, means for connecting the intermediate portions of the bars to the frame and seats mounted on the bars.

9. A seat structure for motor cycles comprising a pair of bars having their opposite ends adapted to be connected respectively to the front and rear portions of a motor cycle frame and disposed upon opposite sides of said frame, means for connecting the intermediate portions of said bars to each other and seats mounted on the bars.

10. In a motor cycle, a frame, a pair of bars disposed upon opposite sides of said frame and having their front ends connected to the forward portion of said frame and their intermediate portions extending rearwardly along the lower portion of said frame and their rear portions extending upwardly and then inwardly and secured to the rear portion of said frame and seats mounted upon the inwardly extending portions.

11. In a motor cycle, a frame, a pair of bars disposed upon opposite sides of said frame and having their front ends connected to the forward portion of said frame and their intermediate portions extending rearwardly along the lower portion of said frame and their rear portions extending upwardly and then inwardly and secured to the rear portion of said frame and seats mounted upon the inwardly extending portions, foot-boards secured to said intermediate portions and means connecting said intermediate portions to the adjacent portion of the frame.

12. In a seat structure for motor cycles, the combination with seats disposed side by side upon opposite sides of the motor cycle frame, of a back for each side, a plate positioned at the rear of the seats, a standard secured to each of said backs and to said plate and brace rods secured to said backs and said plate.

13. In a seating structure for motorcycles, the combination with seats disposed side by side upon opposite sides of the motorcycle frame, of a back adjustable toward and from the seats, and a flexible connection between the backs and the seat supports.

14. In a seating structure for motorcycles, the combination with seats disposed side by side upon opposite sides of the motorcycle frame, of a member adjustable on the motorcycle frame, seat backs secured to said member, and a bendable brace connection between the backs and said member independent of the main connection.

15. In a seat structure for motorcycles, the combination with seats disposed side by side upon opposite sides of the motorcycle frame of a back for each side, a plate positioned at the rear of the seats, and slidable toward and from said seats, a standard secured to each of said backs and to said plate and brace rods to said backs and said plate.

16. In a seating structure for motorcycles, the combination with seats disposed side by side upon opposite sides of the motorcycle frame, of a member adjustable on the motorcycle frame, seat backs secured to said member, and a bendable connection between the seat backs and the seat supporting structure.

17. In an apparatus of the class described, a frame, a pair of bars disposed upon opposite sides of the frame and having their forward ends secured to the frame and extending downwardly along the frame, and outwardly therefrom, and then downwardly to a point adjacent the lower portion of the frame, then extending rearwardly therefrom longitudinally of the frame, then upwardly in a substantially vertical direction, then inwardly toward the frame and toward each other in a substantially horizontal plane, and having their rear ends secured to the frame adjacent the horizontal portions, and seats mounted on said horizontal portions.

18. In an apparatus of the class described, a frame, a pair of bars disposed upon opposite sides of the frame and having their forward ends secured to the frame and extending downwardly along the frame, and outwardly therefrom, and then downwardly to a point adjacent the lower portion of the frame, then extending rearwardly therefrom longitudinally of the frame, then upwardly in a substantially vertical direction, then inwardly toward the frame and toward each other in a substantially horizontal plane, and having their rear ends secured to the frame adjacent the horizontal portions, seats mounted on said horizontal portions, and means connecting the seats independent of the bars.

19. In an apparatus of the class described, a frame, a pair of bars disposed upon opposite sides of the frame and having their forward ends secured to the frame and extending downwardly along the frame, and outwardly therefrom, and then downwardly to a point adjacent the lower portion of the frame, then extending rearwardly therefrom longitudinally of the frame, then in a substantially vertical direction, then inwardly toward the frame and toward each other in a substantially horizontal plane, and having their rear ends secured to the frame adjacent the horizontal portions, seats mounted on said horizontal portions, and means extending beneath the motorcycle frame and connecting the longitudinally extending portions of said bars to each other and to the frame.

20. In an apparatus of the class described, a frame, a pair of bars disposed upon opposite sides of the frame and having their forward ends secured to the frame and extending downwardly along the frame, a clip connecting the bars to each other and to the frame, said bars extending outwardly therefrom and then downwardly to a point adjacent the lower portion of the frame, then extending rearwardly therefrom longitudinally of the frame, then upwardly in a substantially vertical direction, then inwardly toward the frame and toward each other in a substantially horizontal plane, and having their rear ends secured to the frame adjacent the horizontal portions, and seats mounted on said horizontal portions.

In witness whereof I have hereunto set my hand this 15th day of May, 1917.

BERT S. CHILSON.

Witnesses:
CHARLES COX,
S. A. REPETTO.

Copies of this patent may be obtained for five cents each, by addressing the "Commissioner of Patents, Washington, D. C."